United States Patent [19]

Splett et al.

[11] Patent Number: 4,726,025
[45] Date of Patent: Feb. 16, 1988

[54] GENERATION AND DIAGNOSTIC VERIFICATION OF COMPLEX TIMING CYCLES

[75] Inventors: Katherine A. Splett, Burnsville; Steven H. Karban, Apple Valley; Gerald L. Brown, Savage, all of Minn.

[73] Assignee: Sperry Corporation, Blue Bell, Pa.

[21] Appl. No.: 787,853

[22] Filed: Oct. 16, 1985

[51] Int. Cl.$^4$ ............................................. G06F 11/00
[52] U.S. Cl. ......................................... 371/25; 371/21; 371/61
[58] Field of Search .................... 371/25, 21, 61, 62, 371/27; 324/73 R, 73 AT; 364/200, 900

[56] References Cited

U.S. PATENT DOCUMENTS

| | | | |
|---|---|---|---|
| 3,806,717 | 4/1974 | Gloeckler | 235/153 |
| 3,838,264 | 9/1974 | Maker | 371/21 |
| 3,899,665 | 8/1975 | Gaon | 235/153 |
| 4,084,262 | 4/1978 | Lloyd | 371/25 X |
| 4,319,355 | 3/1982 | Mollier | 371/21 |
| 4,326,290 | 4/1982 | Davis | 371/25 X |
| 4,385,385 | 5/1983 | Duplessis | 371/25 |
| 4,528,665 | 7/1985 | Burns | 371/51 |
| 4,531,213 | 7/1985 | Scheuneman | 371/3 |

*Primary Examiner*—Jerry Smith
*Assistant Examiner*—Robert W. Beausoliel, Jr.
*Attorney, Agent, or Firm*—Glenn W. Bowen; Laurence J. Marhoefer

[57] ABSTRACT

A timing generator and verifier is provided in which a PROM stores the timing constants that are employed by the generator. An address counter, which is driven by a clock timer, cycles through an associated portion of the PROM to provide a sequence of output signals which represent timing for a particular mode. If a different mode is selected, the address counter selects a different sequence of output bits. During Normal mode the address counter operates on a cyclic basis driven by a fixed frequency free running master clock. In Verify mode the address counter is stepped by the Host computer. The outputs of the PROM are coupled through a buffer and logic section, where the outputs may be modified before being coupled to an adder which accumulates a checksum based on the outputs of all of the bits for a particular selected timing. The checksum provided by the adder is compared in a comparator with a stored checksum that indicates whether the correct operation of the complex timing cycle for the selected mode has been verified.

10 Claims, 1 Drawing Figure

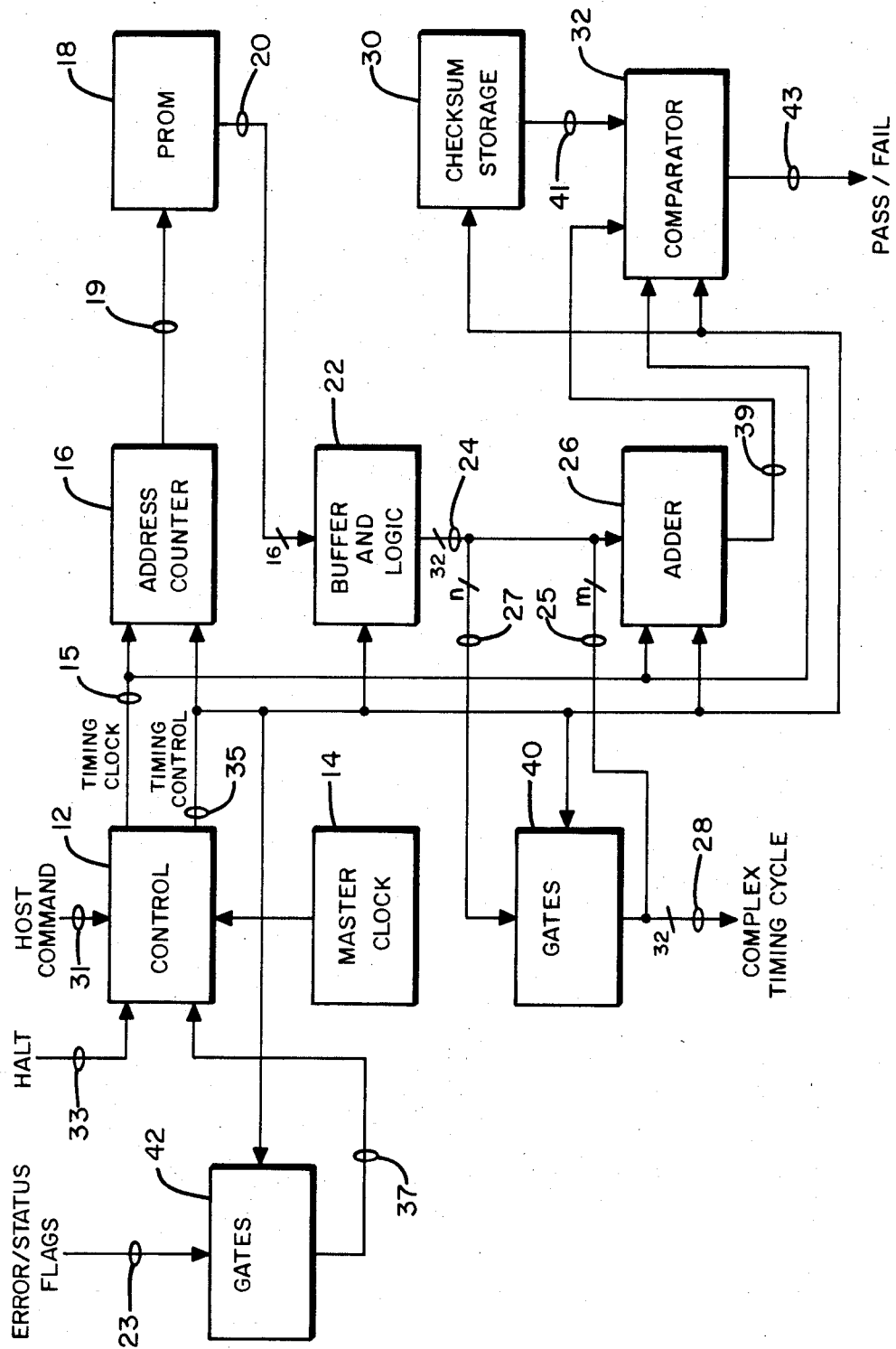

GENERATION AND DIAGNOSTIC VERIFICATION OF COMPLEX TIMING CYCLES

BACKGROUND OF THE INVENTION

The generation of complex multiple timing cycles for digital logic systems commonly requires extensive complex logic circuitry. The verification of the operation of the timing circuitry in the past has imposed additional complexity on the design requirements of the system and has not provided a high level of confidence verification.

In digital logic systems, programmable read-only memory (PROM) is commonly used to store programs and data which are normally accessed by the host computer during operation. Additional PROM is often utilized for the storage and generation of the timing signals for the system. This PROM is not normally accessible by the host computer.

Also included in the system is a buffer and logic circuit. This is a group of buffers, combinational logic and sequential logic circuits which receive timing inputs from the PROM and timing and control inputs from other sources in the system. The buffer and logic circuit acts on these various inputs to produce a selected one of the several possible complex timing cycles.

This system consisting of the PROM and the buffer and logic circuit, has two modes of operation, a Normal mode for normal system operation and a Verify mode for timing cycle verification. In the Normal mode, a free running clock is coupled to an address counter, which successively selects a row in the PROM, which upon selection outputs the stored information in that row to the buffer and logic section. In this mode the address counter operates in a cyclic manner on a continuous basis, and the PROM is read out from the starting to the ending address of the PROM section which is employed for the particular timing mode that is selected. In the Verify mode, the free running clock is disconnected and replaced with a host computer controlled clock which is stepped pulse by pulse so that the address counter steps through the rows of the PROM at a rate controlled directly by the host computer.

Verification of programs stored in programmable read-only memory (PROM) is generally achieved through the use of diagnostic software routines which utilize a checksum operation. The present invention utilizes a PROM which has several sections, each of which stores timing information for a different selectable mode. In normal operation this timing information is only used to generate complex timing cycles, and it is not required to be accessible to the host computer. In order to verify correct operation of the timing circuits, the host computer, or an independent control section switches the timing circuit at a rate which allows the adder to provide a checksum for each row of the PROM, which is added to the checksum provided by all of the preceding rows. The digital checksum that is achieved is compared with a stored checksum which is known to be correct for the selected complex timing cycle. The present invention is thereby capable of providing diagnostic verification with a high level of confidence, for several different complex timing cycles that may be generated for timing the data processing system. For example, the timing generation may be used with a mass memory controller to ensure that the required timing cycles occur in the correct sequences and with the correct intervals.

BRIEF DESCRIPTION OF THE DRAWINGS

The present invention is illustrated by reference to the Figure, which is a block diagram illustration of a system for diagnostic verification of multiple complex timing cycles.

TECHNICAL DESCRIPTION OF THE INVENTION

A complex timing cycle generator is shown in the Figure. A control 12 which is a hardware unit provides a timing clock and various timing controls to the remainder of the timing cycle generator. When a Normal mode command is received on line 31 from the host computer by the control, it causes the output of the master clock 14 to be coupled to the timing clock output of control 12. Clock signals are coupled on the line 15 from clock 14 to an address counter 16 which operates over a range of addresses as determined by the timing control outputs of control 12. The counter may be reset and cycled over again, or it may be halted by command from the host processor on line 33 when a sufficient number of cycles of the timing generator have been completed.

A programmable read-only memory (PROM) 18 contains the timing information for at least two timing modes which may be generated by the timing generator. The address counter applies output bits, via lines 19, to PROM, the output of which is supplied as raw timing signals (16 bits) on the lines 20 to a buffer and logic circuit 22, in a sequential manner from the first accessed address to the last accessed address which is associated with the selected timing cycle. Thus m bits of the 32 output bits from the buffer and logic circuitry 22 are supplied on the lines 24, directly on the lines 25, and n bits are supplied via lines 27 and gates 40 as complex timing cycle bits to the timing lines 28. (n+m=32 in the disclosed embodiment).

During normal operation a HOST command on line 31 to the control causes the address counter 16 to cycle in a repeated pattern to create complex timing cycles of a selected pattern on the lines 20 until a HALT command is supplied to the control 12 on line 33. When the HOST command indicates that a different timing cycle pattern is to be implemented, a different section of the PROM 18 is selected by control 12. Repetitive cycling of the address counter will then cause a different group of stored bits in the PROM to be supplied on the timing lines 28.

The buffer and logic circuit 22 is employed to modify and convert the 16 bits of timing on the lines 20 coupled from the PROM to 32 bits of timing on the lines 24. The buffer and logic circuit 22 is ultimately under the control of the host computer, which directs it via control 12 in unison with the address counter 16 and PROM 18 to produce one of a plurality of timing cycle types.

During Verify mode operation of the timing generator, the control 12 will provide timing control signals from the lines 35 to the gates 42 as required to inhibit any error or status flag signals which otherwise might appear on the lines 23 during Normal mode operation and would interfere with the Verify routine. For example, inhibit signals may be provided on the lines 35 to prevent the error or status flags that are supplied on the line 23 via gates 42 to the lines 37 from affecting the diagnostic procedure; and also to disable some of the refined timing lines 28, via gates 40, to preclude the possibility of altering the data stored in the mass memory.

During the Verify mode procedure, the timing clock output from control 12 is operated in a stepped mode so that the address counter 16 steps through each of its possible selection address outputs at a rate which allows the adder 26 to sequentially receive and add the outputs on all of the lines 24 that are associated with one count of the address counter 16 before the next count is produced. The adder 26 then accumulates a checksum count for all of the accessed memory locations of the PROM for the selected timing cycle under the control of the address counter 16. The checksum output of the adder 26 on the line 39 is a test sum which is compared by the comparator 32 to a stored checksum supplied on line 41 from the checksum storage memory 30 for the timing cycle that is selected.

As noted in the drawing, control 12 supplies a timing control to the address counter 16, the buffer and logic circuitry 22, the adder 26, the comparator 32, and the checksum storage memory 30 so that these components have their appropriate elements selected in accordance with the timing cycle selected by the control 12. If the checksum stored and the sum in the adder 26 are found to be equal by the comparator 32 a Pass signal will be produced by the comparator on the line 43. If they are not equal a Fail comparison signal will be issued indicating the failure of the timing system for the paraticular cycle that was selected. Each of the individual timing cycles that are capable of being selected by the system may thus be individually verified by the timing generator and verifier of the disclosed embodiment.

In the disclosed embodiment sixteen output lines 20 are shown from the PROM 18. In addition, the lines 24 and 28 are shown as being greater in number to lines 20 but this is a function of the buffer and logic circuit 22. The buffer and logic circuit 22 may be implemented as required to produce various combinations of the signals from the lines 20 and from the timing control, so that it is not necessary for the number of output lines 24 to bear any fixed relationship to the number of input lines 20. The adder 26, comparator 32 and checksum storage 30 may be provided by dedicated hardware or by the host processor along with associated software.

What is claimed is:

1. A method of using a device comprising memory means;, memory address selection means, summing means, checksum storage means and comparator means to generate and verify complex timing cycles comprising the steps of:
   storing the timing bits required to generate a plurality of complex timing cycles which comprise a system timing cycle in said memory means,
   coupling a repetitive sequence of said timing bits from said memory address selection means to said memory means,
   adding the digital logical state values of all of said timing bits of said memory means over a complete timing cycle in said summing means,
   retrieving a sum from said checksum storage means that represents a bit sum that should be obtained by said summing means if all of said timing bits of said complex timing cycles are produced without error, during a system timing cycle, and
   comparing the sum retrieved from said checksum storage means and the value obtained by said summing means in said comparative means to determine if said complex timing cycles have been properly generated.

2. A method of using a device as claimed in claim 1 further comprising buffer logic circuit means coupled to said memory means comprising the step of modifying and converting N timing bits received from said memory means to M timing bits, wherein M is greater than N.

3. A method of using a device as claimed in claim 2 wherein said address selection means comprises a clock means and an address counter coupled to said memory means and to receive signals from said clock means,
   comprising the step of selecting bits of said memory means in a sequential repetitive order via said address counter.

4. The method of using a device as claimed in claim 3 wherein said memory means is a programmable read-only memory and said device further comprises a control means and a clock, comprising
   the steps of operating the clock in a continuous manner when said control means is in a Normal mode and in a stepped manner when said control means is in a Verify mode.

5. The method of using a device as claimed in claim 4 comprising control means coupled to said memory means, comprising,
   the steps of selecting a different portion of said memory means for each selected sequence of a plurality of possible selected sequences of said timing bits and obtaining the appropriate sum for said selected sequence from said checksum storage means.

6. The method of using a device as claimed in claim 5 comprising,
   the step of inhibiting the passage of error and status flags into said system via said control means to prevent said flags from altering stored data in said memory means or from adversely affecting said device when said device is in said Verify mode.

7. A method of using a device as claimed in claim 1 wherein said address selection means comprises a clock means and an address counter coupled to said memory means and to receive signals from said clock means,
   comprising the step of selecting bits of said memory means in a sequential repetitive order via said address counter.

8. The method of using a device as claimed in claim 1 wherein said memory means is a programmable read-only memory and said device further comprises a control means and a clock, comprising
   the steps of operating the clock in a continuous manner when said control means is in a Normal mode and in a stepped manner when said control means is in a Verify mode.

9. The method of using a device as claimed in claim 1 comprising control means coupled to said memory means, comprising,
   the steps of selecting a different portion of said memory means for each selected sequence of a plurality of possible selected sequences of said timing bits and obtaining the appropriate sum for said selected sequence from said checksum storage means.

10. The method of using a device as claimed in claim 8 comprising,
    the step of inhibiting the passage of error and status flags into said system via said control means to prevent said flags from altering stored data in said memory means or from adversely affecting said device when said device is in said Verify mode.

* * * * *